No. 626,630. Patented June 6, 1899.
E. D. PEERSTONE.
CRANK FOR BICYCLES.
(Application filed Aug. 5, 1898.)
(No Model.)
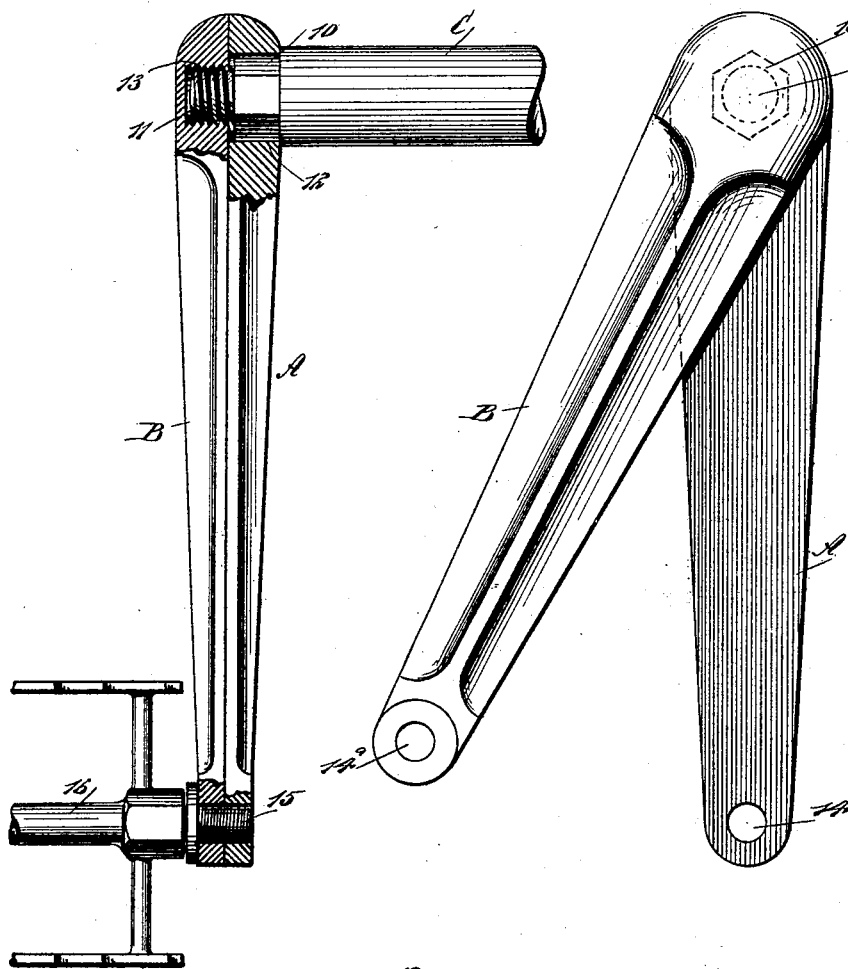
WITNESSES:
INVENTOR
E. D. Peerstone
BY
ATTORNEYS.
THE NORRIS PETERS CO., PHOTO-LITHO., WASHINGTON, D. C.

UNITED STATES PATENT OFFICE.

EARL DRUMMOND PEERSTONE, OF CHICAGO, ILLINOIS.

CRANK FOR BICYCLES.

SPECIFICATION forming part of Letters Patent No. 626,630, dated June 6, 1899.

Application filed August 5, 1898. Serial No. 687,845. (No model.)

*To all whom it may concern:*

Be it known that I, EARL DRUMMOND PEERSTONE, of Chicago, in the county of Cook and State of Illinois, have invented a new and useful Improvement in Cranks for Bicycles, of which the following is a full, clear, and exact description.

The object of my invention is to so construct a crank for bicycles that it may be attached to the crank-shaft without the aid of nuts and to so effect the attachment between the crank and the crank-shaft that the latter will not extend through the former, thus providing for a smooth uninterrupted outer surface for the crank at its connection with the crank-shaft.

A further object of the invention is to provide such a connection between the cranks of a bicycle and the pedal-shaft that the cranks can be quickly and readily detached from the crank-shaft and the shaft removed from the crank-hanger, the connection between the said two parts being also conveniently and expeditiously effected.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved crank, the upper and lower portions of the crank being in vertical section, said figure likewise illustrating a side elevation of a portion of the crank-shaft and a portion of the pedal-bar and pedal. Fig. 2 is a side elevation of the members of the crank separated at their lower ends. Fig. 3 is an inner face view of the upper portion of the outer member of the crank, and Fig. 4 is an outer face view of the upper portion of the inner member of the crank.

The crank is made in two parts or members A and B. These parts or members are of the same shape and their inner faces are flat, so that they will fit closely together. The crank-shaft C is provided with a reduced section 10 at each end, the reduced sections 10 being usually hexagonal, and the crank-shaft is further provided at each extremity with a further reduced and exteriorly-threaded portion 11. Usually the right-hand reduced portion 11 is provided with a right-hand thread and the corresponding left-hand portion 11 is provided with a left-hand thread; but the threads of both reduced portions 11 may be either right or left, as may be desired, since under no conditions can the member B work loose after the members B and C are secured together at their lower ends.

In the upper portion of the inner member A of the crank a polygonal or hexagonal opening 12 is made, fitted snugly to a hexagonal or polygonal reduced portion 10 of the crank-shaft C. The inner face of the outer member B of a crank is provided with a recess 13, the wall of which is threaded in such manner that the said recess may receive a threaded extremity 11 of the crank-shaft C and be screwed thereon, the outer member A of a crank thus serving as a nut, concealing the outer extremity of the crank-shaft C. In this manner a crank may be attached to a crank-shaft without the aid of nuts, and the outer portion of the crank, where it connects with the crank-shaft, may be made perfectly smooth. The two members A and B of a crank are brought together, so that an aperture 14 in the lower end of the member A will register with a corresponding aperture 14ª in the member B. The inner walls of these apertures 14 and 14ª are threaded, so as to receive the threaded inner end of a pedal-bar 15, upon which a pedal 16 may be mounted to revolve in any suitable or approved manner. The apertures 14 and 14ª for the right-hand crank-arm should be provided with right-hand threads and the corresponding apertures of the left-hand crank should be provided with left-hand threads to receive the pedal-bars. The pedal-bars constitute the "lock and key" to the crank-axle; but if occasion demands lock-nuts may be provided for the members of the cranks.

A crank constructed in the above-described manner is not only simple, durable, and economic, but is much more sightly than the cranks that are ordinarily employed, and the improved cranks are so attached to the crank-shaft that nothing will project from said shaft liable to engage with the dress of the rider.

It will be evident that the recess 13 may be in the form of a perforation extending through the crank member B and be internally threaded, as is said recess, the threaded part 11 of the crank-shaft C in this case extending so as to render its end surface flush with the outer face of the crank-section B.

The peculiar construction of the two-part crank-arm hereinbefore described adapts the improvement for rapid and cheap production and also serves to lock the crank-shaft in place when the parts of the device are assembled.

Having thus described my invention, I claim as new and desire to secure by Letters Patent—

1. The combination, with the crank-shaft of a bicycle or a like machine, said shaft being provided with a polygonal surface near its end and a reduced exteriorly-threaded extremity, of a crank constructed in two longitudinal sections arranged to fit snugly together, the inner section of the crank being provided with an opening arranged to receive and to fit upon the polygonal portion of the crank-shaft, the outer section of the crank being provided with a threaded recess arranged to receive the threaded extremity of the said crank-shaft and to conceal the end of said shaft, and a pedal-bar secured to the lower ends of both sections of the crank, for the purpose described.

2. The combination of a crank-shaft having an angular portion, and a threaded portion, contiguous to each other, a crank formed of two longitudinal members, one fitting on the angular portion of the shaft and the other screwing on the threaded portion thereof, and a bar fastened to both sections of the crank.

EARL DRUMMOND PEERSTONE.

Witnesses:
JULIUS A. COLEMAN,
CHAS. S. STURGES.

Correction in Letters Patent No. 626,630.

It is hereby certified that Letters Patent No. 626,630, granted June 6, 1899, upon the application of Earl Drummond Peerstone, of Chicago, Illinois, for an improvement in "Cranks for Bicycles," were erroneously issued to said Peerstone, as sole owner of the invention; whereas said Letters Patent should have been issued to said *Earl Drummond Peerstone and Ole C. Kundtson, of same place,* they being joint owners of the entire interest in said invention as shown by the assignment of record in this Office; and that the said Letters Patent should be read with this correction therein that the same may conform to the record of the case in the Patent Office.

Signed, countersigned, and sealed this 27th day of June, A. D., 1899.

[SEAL.]

WEBSTER DAVIS,
*Assistant Secretary of the Interior.*

Countersigned:
C. H. DUELL,
*Commissioner of Patents.*